United States Patent
Pan et al.

(10) Patent No.: US 7,957,650 B2
(45) Date of Patent: Jun. 7, 2011

(54) PLUGGABLE OPTICAL NETWORK UNIT CAPABLE OF STATUS INDICATION

(75) Inventors: Fulin Pan, Fremont, CA (US); Wen Huang, Cupertino, CA (US); Wen Li, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 596 days.

(21) Appl. No.: 12/146,638

(22) Filed: Jun. 26, 2008

(65) Prior Publication Data

US 2009/0324237 A1   Dec. 31, 2009

(51) Int. Cl.
*H04B 10/00* (2006.01)
(52) U.S. Cl. ......................................... 398/135
(58) Field of Classification Search .................... 398/135
See application file for complete search history.

(56) References Cited

U.S. PATENT DOCUMENTS

| | | | |
|---|---|---|---|
| 5,680,234 A | 10/1997 | Darcie | |
| 5,694,234 A | 12/1997 | Darcie | |
| 5,864,413 A | 1/1999 | Feldman | |
| 5,907,417 A | 5/1999 | Darcie | |
| 6,151,144 A | 11/2000 | Knox | |
| 6,304,350 B1 | 10/2001 | Doerr | |
| 6,381,047 B1 | 4/2002 | Frigo | |
| 6,411,410 B1 | 6/2002 | Wright | |
| 6,721,506 B1 | 4/2004 | Lam | |
| 2002/0039214 A1 | 4/2002 | Ruan | |
| 2002/0186439 A1 | 12/2002 | Buabbud | |
| 2003/0180049 A1 | 9/2003 | Park | |
| 2004/0091265 A1 | 5/2004 | Kim | |
| 2005/0041971 A1 | 2/2005 | Lee | |
| 2006/0082866 A1 | 4/2006 | Takahashi | |
| 2006/0147211 A1 | 7/2006 | Kim | |
| 2006/0153566 A1 | 7/2006 | Sorin | |
| 2007/0116466 A1 | 5/2007 | Gewirtzman | |
| 2007/0165688 A1 | 7/2007 | Lee | |
| 2009/0060509 A1* | 3/2009 | Shimoosako et al. | 398/66 |

* cited by examiner

*Primary Examiner* — Shi K Li
(74) *Attorney, Agent, or Firm* — SV Patent Service

(57) ABSTRACT

A pluggable optical network unit includes a transceiver assembly configured to produce a first electrical signal in response to a first optical signal comprising reception signal data and to emit a second optical signal comprising transmission signal data in response to a second electrical signal. A data processing unit can extract the reception signal data from the first electrical signal and produce the second electrical signal in response to the transmission signal data. An interface unit can receive the reception signal data from the data processing unit, serialize the reception signal data, and send a third electric signal comprising the reception signal data to a network device that the pluggable optical network unit is plugged into. A management unit can modify the third electric signal in accordance to the operation status of at least one of the transceiver assembly or the data processing unit.

22 Claims, 7 Drawing Sheets

PLUGGABLE OPTICAL NETWORK UNIT CAPABLE OF STATUS INDICATION

BACKGROUND

The present disclosure relates to optical communications over an optical network.

As voice over Internet Protocol (VoIP) and Internet Protocol television (IPTV) grow in popularity, an increasing number of users desire to have access to these services from their premises. Similarly, businesses now require more bandwidth available to their premises with necessary quality of service. To meet these needs, network carriers are building optical access networks with different network topologies such as fiber-to-the-premises, fiber-to-the-node, or fiber-to-the-building with many different access transport solutions including BPON, EPON, GPON, WDN-PON and active Ethernet.

As service provides' networks are becoming more complex, different technology solutions and a wide variety of equipments at customer premises have made inventory and operational expenditure (OPEX) key challenges for service providers across the globe. There is therefore a need to enhance system and management functions and to simplify operational complexity in access network. There is also a need to maintain or improve ease of use for the operators even as the complexity and integration increase in the optical networks.

SUMMARY

In a general aspect, the present specification relates to a pluggable optical network unit including a transceiver assembly that can produce a first electrical signal in response to a first optical signal and to emit a second optical signal in response to a second electrical signal, wherein the first optical signal comprises reception signal data, wherein the second optical signal comprises transmission signal data; a data processing unit in communication with the transceiver assembly, wherein the data processing unit can extract the reception signal data from the first electrical signal and produce the second electrical signal in response to the transmission signal data; an interface unit that can receive the reception signal data from the data processing unit, serialize the reception signal data, and send a third electric signal comprising the reception signal data to a network device that the pluggable optical network unit is plugged into; and a management unit that can monitor operation status of the transceiver assembly and the data processing unit, wherein the management unit can modify the third electric signal in accordance to the operation status of at least one of the transceiver assembly or the data processing unit.

In another general aspect, the present specification relates to a pluggable optical network unit including a transceiver assembly that can produce a first electrical signal in response to a first optical signal and to emit a second optical signal in response to a second electrical signal, wherein the first optical signal comprises reception signal data, wherein the second optical signal comprises transmission signal data; a data processing unit in communication with the transceiver assembly, wherein the data processing unit can extract the reception signal data from the first electrical signal and produce the second electrical signal in response to the transmission signal data; an interface unit that can receive the reception signal data from the data processing unit, serialize the reception signal data, and send a third electric signal comprising the reception signal data to a network device that the pluggable optical network unit is plugged into; a management unit that can monitor operation status of the transceiver assembly or the data processing unit, wherein the management unit can modify the third electric signal in accordance to the operation status of at least one of the transceiver assembly, or the data processing unit; and an optical interface in communication with the transceiver assembly, wherein the optical interface can receive the first optical signal from a remote network device and send the second optical signal to the remote optical device, wherein the management unit can produce a control signal to modify the third electric signal if the operation status indicates that at least one of the transceiver assembly or the data processing unit malfunctions or if the optical interface fails to receive the first optical signal from the remote network device.

In yet another general aspect, the present specification relates to a method of communication and monitoring in an optical network including plugging a pluggable optical network unit into a local network device having an indicator light, wherein the pluggable optical network unit comprises a transceiver assembly, a data processing unit, and an interface unit; producing a first electrical signal by the transceiver assembly in response to a first optical signal, wherein the first optical signal comprises reception signal data; extracting the reception signal data from the first electrical signal by the data processing unit; receiving the reception signal data by the interface unit; serializing the reception signal data by the interface unit; sending a third electric signal comprising the reception signal data from the interface unit to the local network device; producing a second electrical signal by the data processing unit in response to the transmission signal data; emitting a second optical signal by the transceiver assembly in response to the second electrical signal; and modifying the third electric signal in accordance to the operation status of at least one of the transceiver assembly or the data processing unit.

Implementations of the system may include one or more of the following. The management unit can produce a control signal to modify the third electric signal if the operation status indicates that at least one of the transceiver assembly or the data processing unit malfunctions. The pluggable optical network unit can further include an optical interface in communication with the transceiver assembly, wherein the optical interface can receive the first optical signal from a remote network device and send the second optical signal to the remote optical device, wherein the management unit can modify the third electric signal with a first control signal in a first pattern if the optical interface fails to receive the first optical signal from the remote network device. The management unit can modify the third electric signal with a second control signal in a second pattern if the operation status of the transceiver assembly indicates that the transceiver assembly malfunctions, wherein the management unit can modify the third electric signal with a third control signal in a third pattern if the operation status of the data processing unit indicates that the data processing unit malfunctions. The management unit can control the interface unit to modify the third electric signal in accordance to the operation status of at least one of the transceiver assembly, the data processing unit, or the optical interface. The interface unit can receive the transmission signal data from the network device that the pluggable optical network unit is plugged into, deserialize the transmission signal data, and send the transmission signal data to the data processing unit. The pluggable optical network unit can further include a data path interface in communication with a data processing unit in the network device, wherein the data path interface can send the reception data to the network device and to receive a fourth electrical signal comprising the transmission signal data from the network device that the pluggable optical network unit is plugged into. The data path interface can be compatible with a standard selected from the group consisting of GBIC, SFF, SFP, XFP, X2, XENPAK, and SFP+. The transceiver assembly can include an optical transmitter that can emit the second optical signal in response to the second electrical signal; and an optical receiver that can produce the first electrical signal in response to the first optical signal. The data processing unit can perform at least one of system-layer functions comprising media access control (MAC), Ethernet/ATM switching, forward error correction, or OAM message processing.

Embodiments may include one or more of the following advantages. The disclosed integrated optical network unit (ONU) can significantly reduce complexity, cost, and maintenance work of an optical network. The disclosed integrated ONUs are easy to use and allow intuitive monitoring of network connectivity by the operators.

The disclosed optical transceiver devices carry intelligent features for local system layer management without involving host devices, which significantly simplifies the communications of optical networks. The disclosed optical transceiver devices can thus allow optical communications between different types of host device and network device without requiring interoperability between the devices. The disclosed transceiver devices can also be implemented in compliance with standard transceiver format and protocols. The additional local management is provided while keeping the standard communications in the optical/physical layer in the conventional optical transceivers and with host or remote network equipment.

The disclosed optical transceiver is applicable to a multi-channel optical communication network such as an optical network between an optical terminal, remote nodes, and optical network units.

Although the specification has been particularly shown and described with reference to multiple embodiments, it will be understood by persons skilled in the relevant art that various changes in form and details can be made therein without departing from the spirit and scope of the specification.

DETAILED DESCRIPTION

Figure 1:
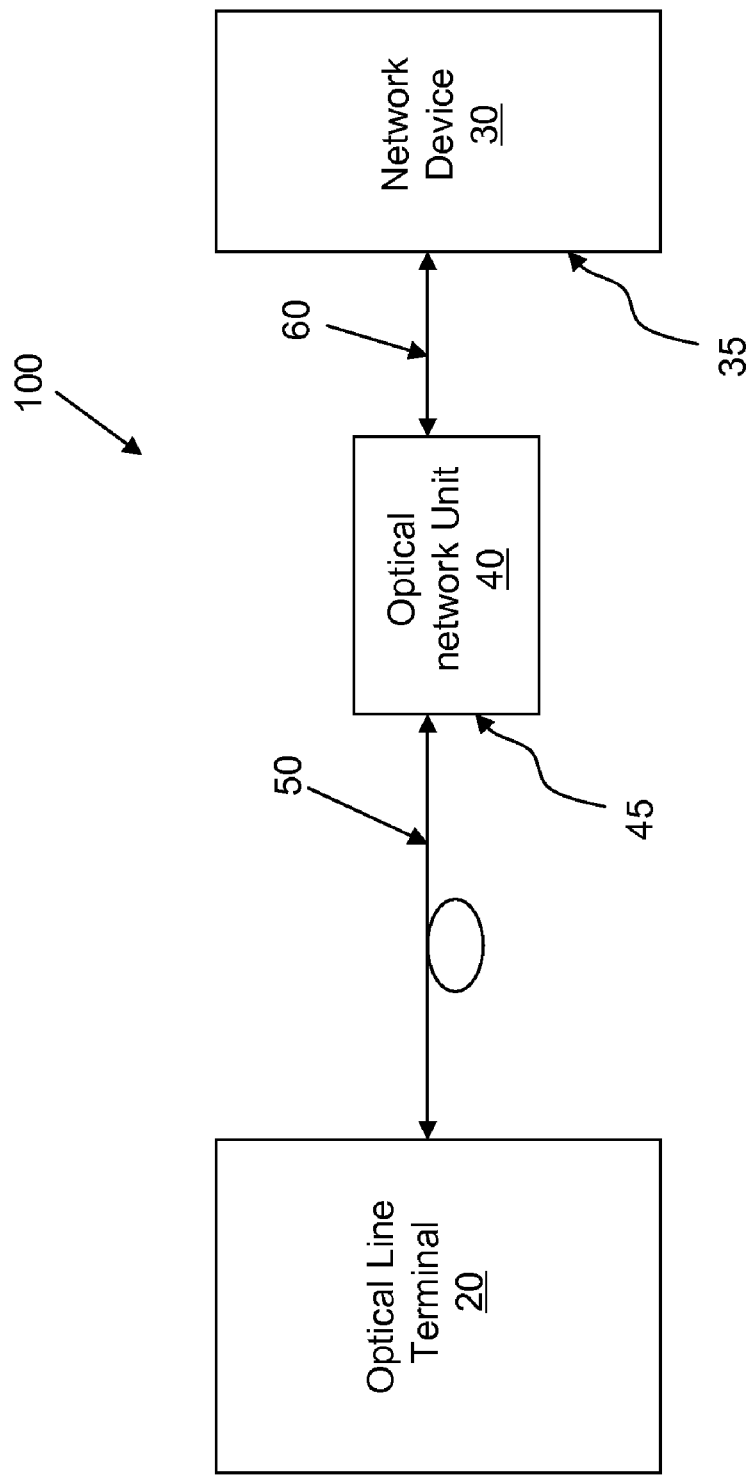
FIG. 1 is a block diagram for a conventional optical network including an optical line terminal (OLT), an ONU, and a remote network device.

Referring to FIG. 1, a conventional optical network system 100 includes an OLT 20 at a central location, and a standalone ONU 40 and a network device 30 at a remote location. The OLT 20 is connected with the ONU 40 via an optical link 50 that can be formed by a single fiber or a fiber bundle. The ONU 40 is connected to the network device 30 via a local data cable 60 which for example can include twist-pair cable and optical fiber.

Figure 2A:
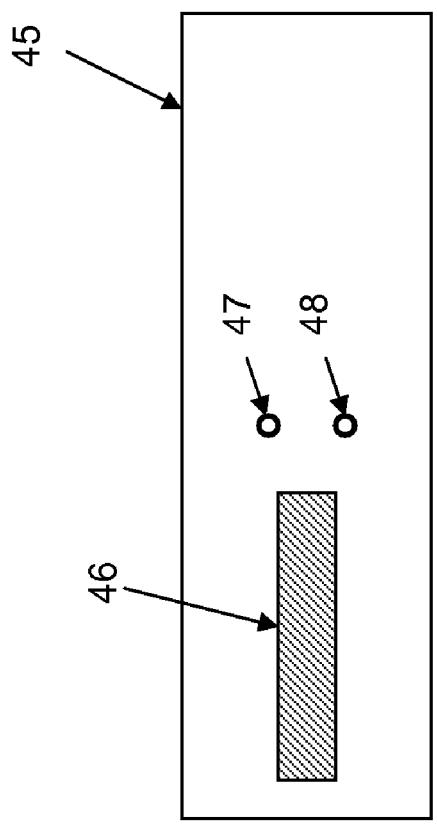
FIG. 2A illustrates a front panel of the ONU, including a connector and a light indicator, in the conventional optical network of FIG. 1.
Figure 2B:
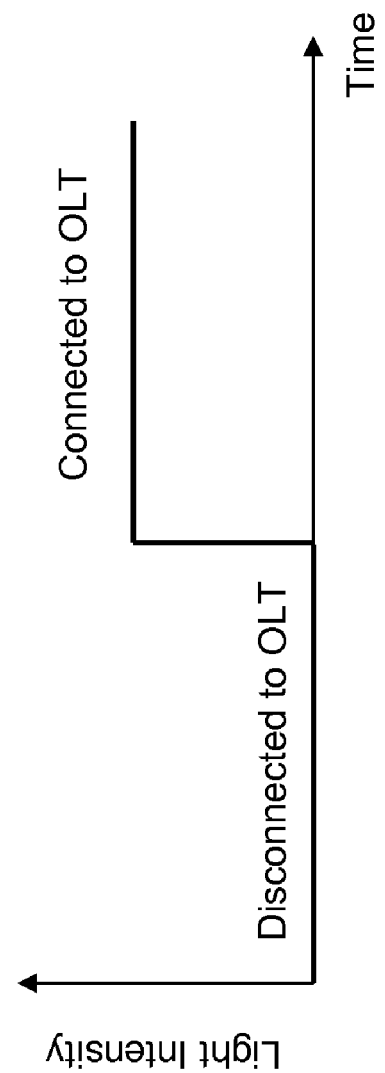
FIG. 2B illustrates light-intensity changes in the light indicator in FIG. 2A indicating the status of the ONU's connectivity with the OLT.

Referring to FIG. 2A, the ONU 40 typically includes a front panel 45 that includes a connection port 46 and one or more indicator lights 47, 48. The connection port 46 is configured to receive a connector at the end of the optical link 50. The indicator lights 47, 48 can be implemented by light emitting diodes (LEDs). An indicator light (e.g. 47) can be used to indicate the connection status between the ONU 40 and the OLT 20. For example, as shown in FIG. 2B, the indicator light 47 can be turned on to emit light if the ONU 40 establishes link with OLT 20, and turned off if the ONU 40 fails to establish link with the OLT 20.

Figure 3A:
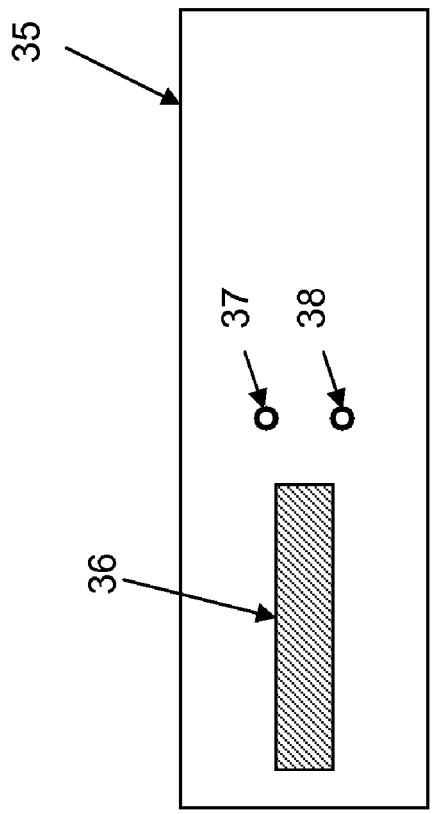
FIG. 3A illustrates a front panel of the network device, including a connector and a light indicator, in the conventional optical network of FIG. 1.
Figure 3B:
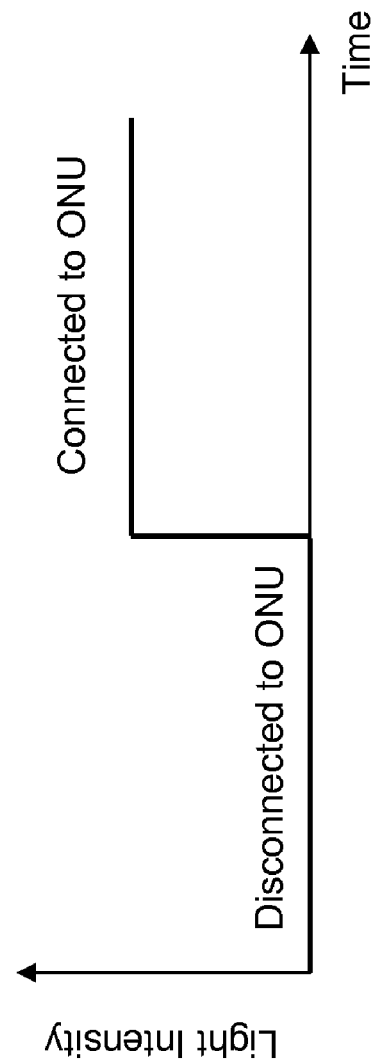
FIG. 3B illustrates light-intensity changes in the light indicator in FIG. 3A indicating the status of the connectivity of the network device with the ONU.

Referring to FIG. 3A, the network device 30 typically also includes a front panel 35 that includes a connection port 36 and one or more indicator lights 37, 38. The connection port 36 is configured to receive a connector at the end of the data cable 60. The indicator lights 37, 38 can be implemented by light emitting diodes (LEDs). An indicator light 37 can be used to indicate the connection status between the network device 30 and the ONU 40. For example, as shown in FIG. 3B, the indicator light 37 can be turned on to emit light if the network device 30 establishes link with the ONU 40, and turned off if the network device 30 fails to establish link with the ONU 40. Another light indicator 38 can be used to indicate data transfer activities between the network device 30 and the ONU 40 via the data cable 60.

Figure 4:
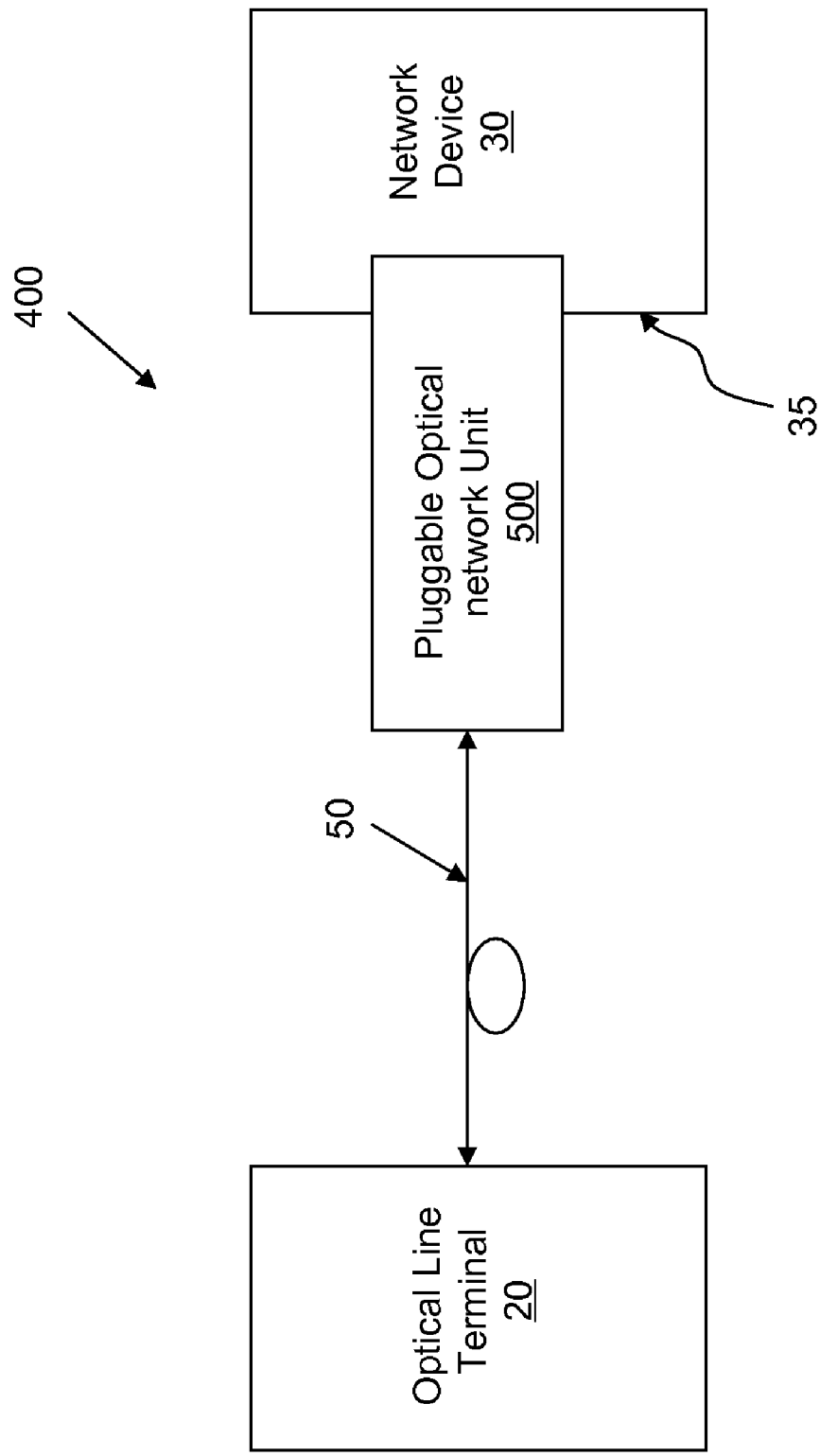
FIG. 4 is a block diagram for an optical network, including an optical line terminal (OLT), a remote network device, and an ONU plugged into the remote network device in accordance to the present specification.

In the present specification, referring to FIG. 4, an optical network system 400 includes a network device such as an OLT 20 and a pluggable ONU 500 plugged into a network device 30 at a remote site from the OLT 20. The pluggable ONU 500 is an integrated, pluggable, and not a standalone device. The pluggable ONU 500 can have a form factor as defined by standards for optical transceivers, such as GBIC, SFF, small form-factor pluggable (SFP), XFP, X2, XENPAK, and SFP+. The data path and control path interfaces between the pluggable ONU 500 and the network device 30 can also be defined by such standards. As described below, the pluggable ONU 500 includes intelligent functions capable of diagnostic monitoring and optical network management. In the present specification, the pluggable ONU 500 can also be referred to as "ONU system stick".

The OLT 20 can communicate with the network device 30 by communications at the standard interface with the pluggable ONU 500 and communications between the pluggable ONU 500 and the network device 30.

The architecture of modern communication networks are commonly defined by an open system interconnection (OSI)

model comprising the following network layers: Layer 1: physical layer; Layer 2: data link layer; Layer 3: network layer; Layer 4: transport layer; Layer 5: session layer; Layer 6: presentation layer; and Layer 7: application layer. In the present specification, the term "system layer" refers to the Layers from Layer 2 to Layer 7. Conventional optical transceivers include simple *optical/electrical* (O/E) converters and *operate* purely the physical *layer*. T*he* disclosed ONU stick provides functions beyond *physical layer*. T*hese* operations can *include*, for *example*, media access control (MAC), E*th-ernet*/ATM *switching*, operation administration management (OAM) message *process, forward* error correction (FEC), *etc*.

Figure 5:
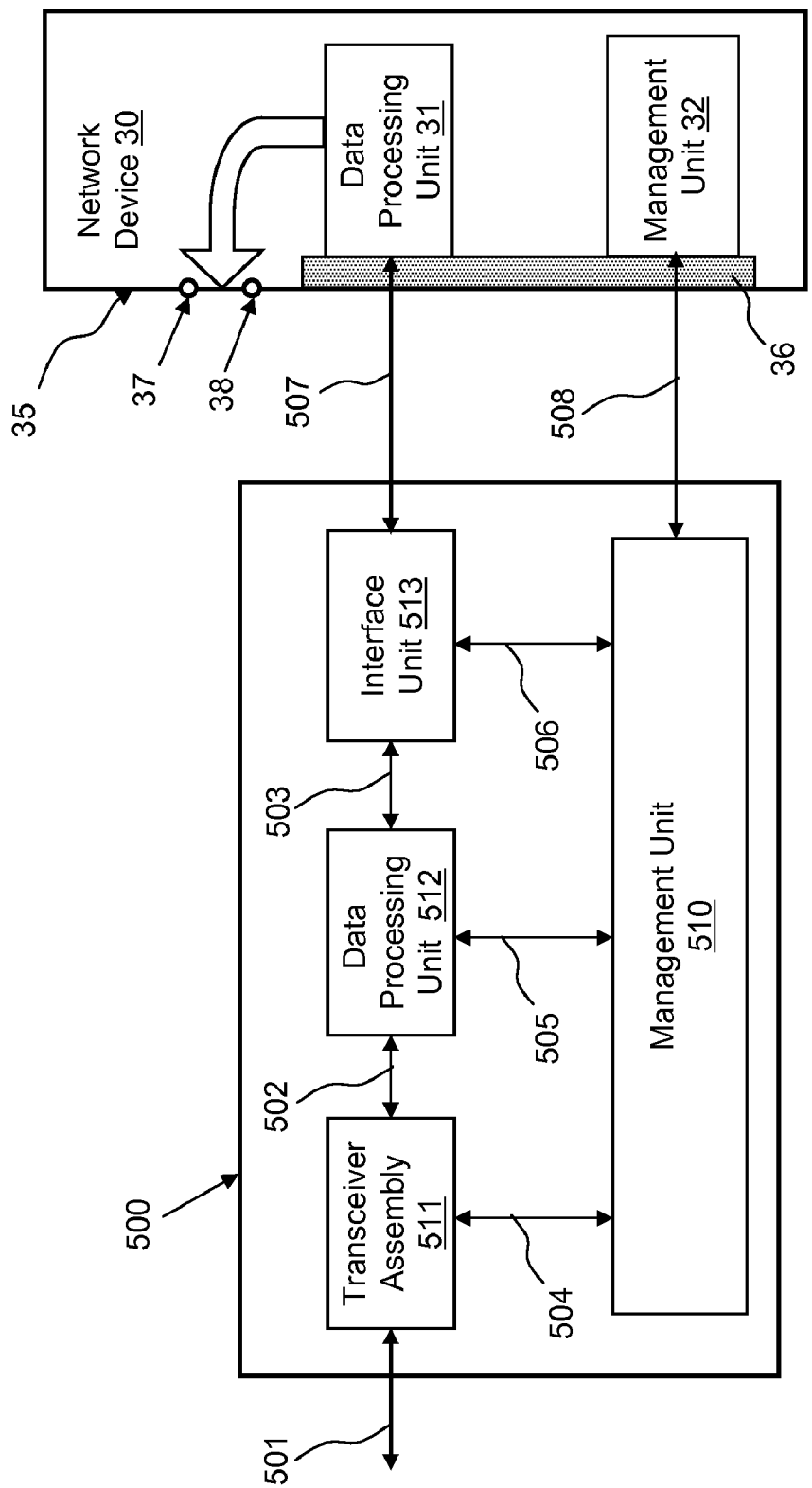
FIG. 5 is a detailed block diagram for an exemplified pluggable ONU and the network device in the optical network of FIG. 4.

Referring to FIG. 5, the pluggable ONU 500 includes a transceiver assembly 511 that includes an optical transmitter (not shown) and an optical receiver (not shown). The optical transmitter can transmit transmission optical signals at an optical interface 501 upstream to the OLT 20. The optical receiver can receive reception optical signals at the optical interface 501 downstream from the OLT 20 and to generate an electric signal at the interface 502. The transceiver assembly 511 can also include a laser driver for driving the optical transmitter and a post amplifier for amplifying electric signals from the optical receiver.

The pluggable ONU 500 also includes a data processing unit 512 that can perform system-layer functions such as media access control (MAC), switch/bridge data protocol, etc. which are beyond physical layer. The data processing unit 512 is in communication with a interface unit 513 at an interface 503. When the pluggable ONU 500 is plugged into the network device 30, the interface unit 513 can communicate a data processing unit 31 in the network device 30 via an interface 507.

The interface unit 513 can perform physical layer functions such as Serdes or PHY functions. Serdes functions can include data serialization, data deserialization, and clock extraction functions for a physical layer interface device. A PHY functions can connect a link layer device (often called a MAC) to a physical medium such as an optical fiber. A PHY typically includes a PCS (Physical Coding Sublayer) and a PMD (Physical Medium Dependant) layer. The PCS can encode and decode the transmission signal data that is transmitted and received. The data encoding is to make it easier for the receiver to recover the signal. For example, the interface unit 513 can deserialize data in electric signals received from the data processing unit 31 before sending the parallel data to the data processing unit 512; the data conversion unit 513 can also serialize parallel data received from data processing unit 512 and send the serialized data to the data processing unit 31.

A management unit 510 controls, monitors and manages the performance of the pluggable ONU 500. The management unit 510 can communicate with the transceiver assembly 511, the data processing unit 512, and the data conversion unit 513 respectively at the interfaces 504, 505, and 506. When the pluggable ONU 500 is plugged into the network device 30, the management unit 510 can communicate with a management unit 32 in the network device 30 via an interface 508.

The interfaces 507 and 508 respectively define data path and control path. The interfaces 507 and 508 can be a high speed differential serial interface, Inter-Integrated Circuit (I2C), differential serial interface, gigabit media independent interface (GMII), 10G media independent interface (XGMII), 10G attachment unit interface (XAUI), General Purpose Input/Output (GPIO), or other standard interfaces.

In some embodiments, the management unit 510 can perform transformations of data format and communication protocols. For example, a command based on I2C received from the interface 508 in the control path from the management unit 32 can be transformed by the management unit 510 to a UART format before it is sent to the data processing unit 512 via the interface 505 to control the data processing unit 512 or forward the command to the OLT 20.

In the transmission data path, the interface unit 513 receives electric signals containing serialized transmission signal data from the data processing unit 31 in the network device 31 via the data path interface 507, deserialize the transmission signal data, and sends deserialized or parallel transmission signal data to the data processing unit 512 which processes the parallel transmission signal data. The transmission data is then sent to the transceiver assembly 511, in where the laser diver drives the optical transmitter to convert the electric signal into optical signal to be emitted at the optical interface 501 and to be received by the OLT 20.

In the reception data path, the transceiver assembly 511 receives an optical signal containing reception data at the optical interface 501 and sends an electric signal containing the reception signal data to the data processing unit 512. The data processing unit 512 processes the reception signal data and sends it in parallel format to the interface unit 513, which can serialize the reception data before sending it to the data processing unit 31 via the interface 507.

In the control path, a control signal is communicated through a control path interface 508 between the management unit 510 in the pluggable ONU 500 and the management unit 32 in the network device 30. A control signal can include diagnostic data, configuration data and other management data. The network device 30 can manage operations of the pluggable ONU 500 in the optical/physical layer through the control-path interface 508. The operations the optical/physical layer can include control and monitoring of the laser driver and the post amplifier control in the transceiver assembly 511, communications with and monitoring of the data processing unit 512, monitoring of optical signals and related parameters, tracking and responding to warnings and alarms, and other management functions in the optical/physical layer as defined in various standards and multiple source agreements (MSA).

Importantly, the management unit 510 can enable or disable functions of the interface unit 513, which respectively connects or disconnects with network device 30 via the data-path interface 507.

The transceiver assembly 511 can produce a first electrical signal in response to a first optical signal received from the OLT 20 via optical link 50. The first optical signal includes reception signal data. The transceiver assembly 511 can also emit a second optical signal in response to a second electrical signal comprising transmission signal data. The data processing unit 512 is in communication with the transceiver assembly 511. The data path interface 507 can send the reception data to the network device 30 and receive a third electrical signal comprising the transmission data from the network device 30. The data processing unit 512 can extract the reception signal data from the first electrical signal and produce the second electrical signal in response to the third electrical signal comprising the transmission signal data. The data processing unit 512 can perform system-layer functions that include media access control (MAC), Ethernet/ATM switching, forward error correction, or OAM message processing. The management unit 510 can control the data processing unit 512 to perform the system-layer functions.

Figures 6A, 6B:
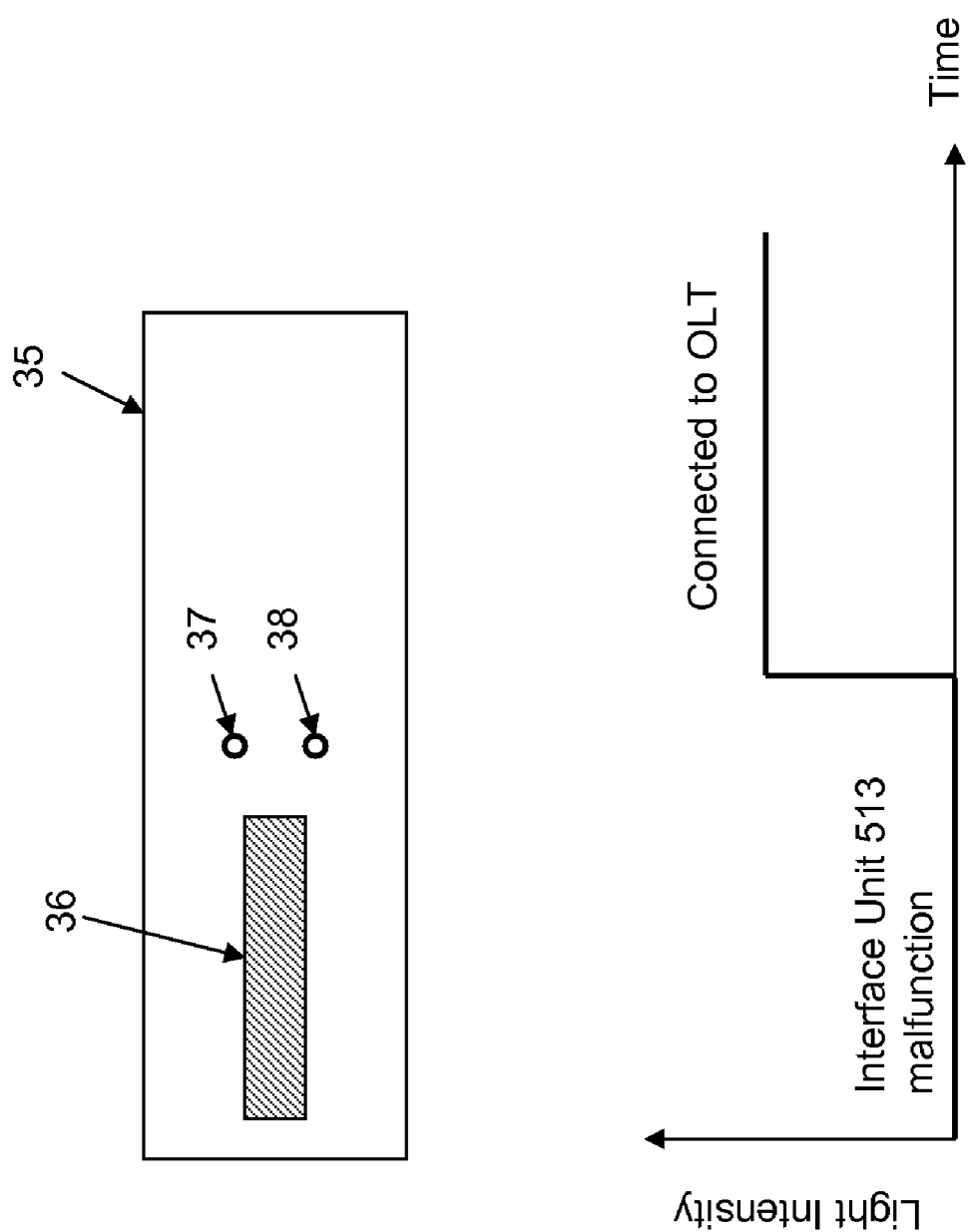
FIG. 6A illustrates a front panel of the network device, including a connector and a light indicator, in the conventional optical network of FIG. 5.
FIG. 6B illustrates light-intensity states for the light indicator of FIG. 6A indicating the connection status between the network device and the pluggable ONU and/or with the remote OLT.

The front panel of the network device 30, as shown in FIG. 6A, includes a front panel 35 that typically includes a connection port 36 and one or more indicator lights 37, 38. The connection port 36 is configured to receive the pluggable ONU 500. The light indicators 37 and 38 are controlled by the data processing unit 31 or the management unit 32. The indicator light 37 can be used for indicating connection status. The light indicator 38 can be used to indicate data transfer activities between the network device 30 and the pluggable ONU 500 and/or the OLT 20. The indicator lights 37, 38 can be implemented by light emitting diodes (LEDs), and are mounted on the front panel 35 for easy observation by the operator.

In most network devices, a light indicator is turned on when a reception data signal is received at the data path interface and the network device established link with its link partner at the data path interface and turned off when no reception signal is received at the data path interface or no connection is established with its link partner at the ONU at the data path interface.

Conventionally, an indicator light can be used to indicate the connection status between two network elements, such as ONU 40 and network device 30 shown in FIG. 1: an "on state" in the indicator light 37 can indicates that a connection is made; and an "off state" can indicate a loss of connection. However, in present specification shown in FIG. 4, this level of indication of connection status is very limited and does not allow an operator to properly identify the location of the problem when a disconnection occurs. Since the disclosed pluggable ONU 500 can include several internal units, disconnections can occur at multiple locations within the pluggable ONU 500, at the optical interface 501 or the optical link 50, or at the OLT 20. It is very desirable for diagnostics and problem solving if an operator can detect the locations of disconnection as early and as easily as possible.

TABLE I

Exemplified Light Indicator States for Indicating network Connections

| OLT Connection | Transceiver Assembly | Data Processing Unit | Interface Unit | Light Indicator |
|---|---|---|---|---|
| OK | OK | OK | OK | ON |
| N/A | N/A | N/A | Not connected | OFF |
| Malfunction | OK | OK | OK | Blinking at Frequency 1 |
| N/A | Malfunction | OK | OK | Blinking at Frequency 2 |
| N/A | N/A | Malfunction | OK | Blinking at Frequency 3 |

In accordance with the present invention, the disclosed pluggable ONU 500 can intelligently and clearly indicate the connection status as well as the locations for a disconnection by using status indicators on a standard network device. In some embodiments, referring to Table 1, the indicator 37 can be kept statically on, as shown by the high light-intensity state in FIG. 6B, if the OLT 20 establishes connection with the transceiver assembly 511 via the optical link 50 and the optical interface 501, when the transceiver assembly 511 and the data processing unit 512 are in proper operation states, and when a connection is established between the data interface unit 513 and the data processing unit 31. The indicator 37 is kept statically off, also shown in FIG. 6B, if the data processing unit 31 fails to establish connection with the data interface unit 513 regardless of the connection status with the OLT 20 at the optical interface 501 or the operation status of the transceiver assembly 511 or the data process unit 512 and, as shown by the no light state in FIG. 6B. (It should be noted that it is rare for the data processing units 512 and the data conversion unit 513 and the connection to OLT 20 to fail at the same time.)

Figure 6C:
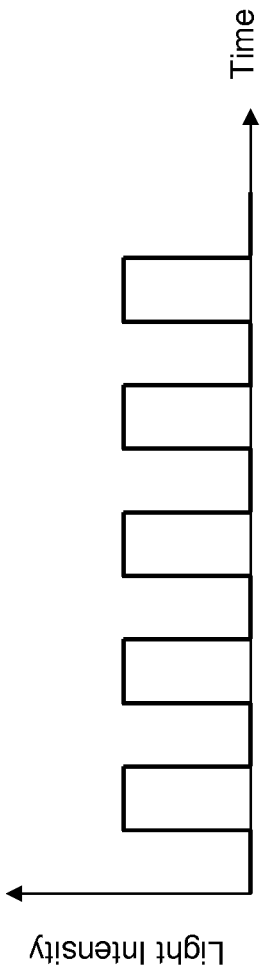
FIGS. 6C-6E illustrates additional light-intensity states for the light indicator of FIG. 6A indicating the connectivity status inside the pluggable ONU.

The indicator 37 can be controlled to a blinking state if the connection fails to be established between the OLT 20 and the transceiver assembly 511 or certain internal unit in the pluggable ONU 500 is not properly functioning. For example, the indicator 37 can be controlled to an alternating on/off state (blinking state) in a first pattern if the transceiver unit 511 fails to establish a link with the OLT 20 a the optical interface 501 (e.g. the transceiver unit 511 fails to receive an optical signal or a correct optical signal from the OLT 20). The first pattern can for example be an alternating signal at a first frequency. This can be caused by a failure at the OLT 20 or by a failure in the optical link 50. The management unit 510 can detect such an operation status and produce a control signal in the first pattern to enable/disable the interface unit 513. As a result, the connection between the interface unit 513 and the data processing unit 31 is alternately turned on and off. In response, the data processing unit 31 switches the light indicator 37 on and off, also in the first pattern, as shown in FIG. 6C. A blinking light signal emitted by the light indicator 37 in the first pattern thus indicates a failed connection between the optical interface 501 with the OLT 20.

Figure 6D:
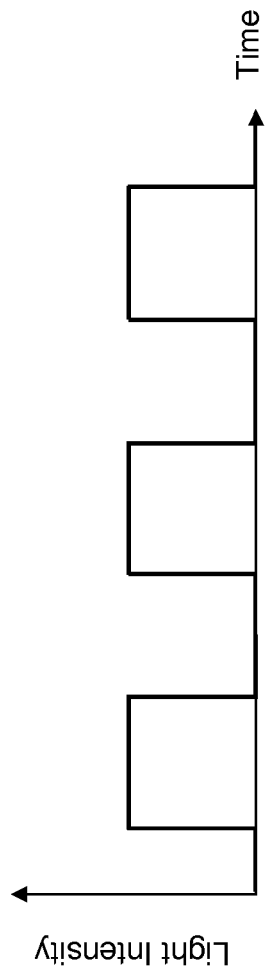

If the transceiver assembly 511 malfunctions, the management unit 510 can detect such an operation status and produce a control signal in a second pattern to enable/disable the interface unit 513. The second pattern can for example be an alternating signal at a second frequency. In response, the data processing unit 31 switches the light indicator 37 on and off, also in the second pattern, as shown in FIG. 6D. A blinking light signal emitted by the light indicator 37 in the second pattern can therefore indicate malfunction of the transceiver assembly 511.

Figure 6E:
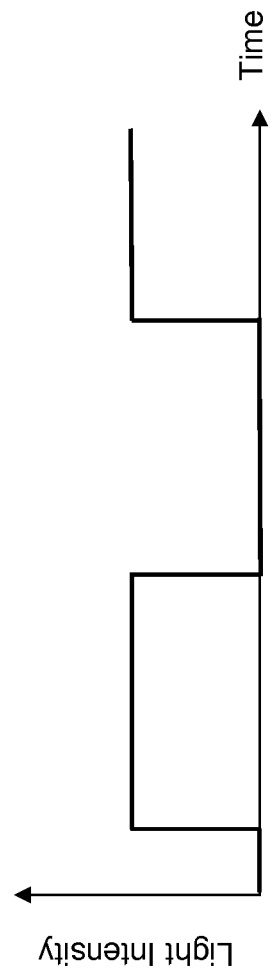

Similarly, if the data processing unit 512 malfunctions, the management unit 510 can detect such an operation status and produce a control signal in a third pattern to enable/disable the interface unit 513. An example of the third pattern is an alternating signal at a third frequency. In response, the data processing unit 31 switches the light indicator 37 on and off, also in the third pattern, as shown in FIG. 6E. A blinking light signal emitted by the light indicator 37 in the third pattern can therefore indicate malfunction of the data processing unit 512.

An advantage of the above disclosed pluggable ONU is that it allows an operator to quickly and easily pin-point the location of a disconnection problem when it occurs.

Another advantage of the above disclosed pluggable ONU is that it is applicable to most types of network devices without requiring modifications. A network device can control its light indicators conventionally while providing extra status about the above disclosed pluggable ONU.

Another advantage of the above disclosed pluggable ONU is that it alleviates the needs for additional light indicators on the pluggable ONUs for indicating its internal operation status, which simplifies design and thus lowers costs for the pluggable ONU.

It is understood that the specific configurations and parameters described above are meant to illustrate the concept of the specification. The disclosed systems and methods can be compatible with variations of configurations and parameters without deviating from the spirit of the present invention. For example, the disclosed systems and methods are compatible with point-to-point optical networks and point-to-multi-point optical networks. The disclosed system and methods are also compatible with active and passive devices. The disclosed pluggable ONU and optical communication network can include additional components or have different constructions as described above. The disclosed optical transceivers can be compatible with other standards not listed in the above description.

The blinking signals for indicating locations of the malfunction or disconnection can be implemented in different forms. For example, instead of difference in blinking frequencies, the duty cycles of the blinking signals can be different. For example, one blinking signal having a period of 4 seconds can have 1 second on time and 3 second off time in each period. Another blinking signal can also have a period of 4 seconds but can have 3 second on time and 1 second off time in each period. In some embodiments, the operation and connection status at different interface and units from the remote OLT and in the ONU can be flagged by more than on light indicator. For example, two light indicators can be switched on or off at different frequencies to allow higher number of operation/connection states to be demonstrated or to allow easy representation of the operation/connection states.

What is claimed is:

1. A pluggable optical network unit, comprising:
a transceiver assembly configured to produce a first electrical signal in response to a first optical signal and to emit a second optical signal in response to a second electrical signal, wherein the first optical signal comprises reception signal data, wherein the second optical signal comprises transmission signal data;
a data processing unit in communication with the transceiver assembly, wherein the data processing unit is configured to extract the reception signal data from the first electrical signal and produce the second electrical signal in response to the transmission signal data;
an interface unit configured to receive the reception signal data from the data processing unit, serialize the reception signal data, and send a third electric signal comprising the reception signal data to a network device that the pluggable optical network unit is plugged into; and
a management unit configured to monitor operation status of the transceiver assembly and the data processing unit, wherein the management unit is configured to modify the third electric signal in accordance to the operation status of at least one of the transceiver assembly or the data processing unit, wherein the management unit is configured to produce a control signal to modify the third electric signal if the operation status indicates that at least one of the transceiver assembly or the data processing unit malfunctions.

2. The pluggable optical network unit of claim 1, wherein the control signal is configured to modify the third signal to produce a modified electric signal if the operation status indicates that at least one of the transceiver assembly or the data processing unit malfunctions, the pluggable optical network unit further comprising an indicator light configured to emit a light signal to indicate the malfunction in response to the modified electric signal.

3. The pluggable optical network unit of claim 1, further comprising an optical interface in communication with the transceiver assembly, wherein the optical interface is configured to receive the first optical signal from a remote network device and send the second optical signal to the remote optical device, wherein the management unit is configured to modify the third electric signal with a first control signal in a first pattern if the optical interface fails to receive the first optical signal from the remote network device.

4. The pluggable optical network unit of claim 3, wherein the management unit is configured to modify the third electric signal with a second control signal in a second pattern if the operation status of the transceiver assembly indicates that the transceiver assembly malfunctions, wherein the management unit is configured to modify the third electric signal with a third control signal in a third pattern if the operation status of the data processing unit indicates that the data processing unit malfunctions.

5. The pluggable optical network unit of claim 1, wherein the management unit is configured to control the interface unit to modify the third electric signal in accordance to the operation status of at least one of the transceiver assembly, the data processing unit, or the optical interface.

6. The pluggable optical network unit of claim 1, wherein the interface unit is configured to receive the transmission signal data from the network device that the pluggable optical network unit is plugged into, deserialize the transmission signal data, and send the transmission signal data to the data processing unit.

7. The pluggable optical network unit of claim 1, further comprising a data path interface in communication with a data processing unit in the network device, wherein the data path interface is configured to send the reception data to the network device and to receive a fourth electrical signal comprising the transmission signal data from the network device that the pluggable optical network unit is plugged into.

8. The pluggable optical network unit of claim 7, wherein the data path interface is compatible with a standard selected from the group consisting of GBIC, SFF, SFP, XFP, X2, XENPAK, and SFP+.

9. The pluggable optical network unit of claim 1, wherein the transceiver assembly comprises:
an optical transmitter configured to emit the second optical signal in response to the second electrical signal; and
an optical receiver configured to produce the first electrical signal in response to the first optical signal.

10. The pluggable optical network unit of claim 1, wherein the data processing unit is configured to perform at least one of system-layer functions comprising media access control (MAC), Ethernet/ATM switching, forward error correction, or OAM message processing.

11. A pluggable optical network unit, comprising:
a transceiver assembly configured to produce a first electrical signal in response to a first optical signal and to emit a second optical signal in response to a second electrical signal, wherein the first optical signal comprises reception signal data, wherein the second optical signal comprises transmission signal data;
a data processing unit in communication with the transceiver assembly, wherein the data processing unit is configured to extract the reception signal data from the first electrical signal and produce the second electrical signal in response to the transmission signal data;
an interface unit configured to receive the reception signal data from the data processing unit, serialize the reception signal data, and send a third electric signal comprising the reception signal data to a network device that the pluggable optical network unit is plugged into;
a management unit configured to monitor operation status of the transceiver assembly or the data processing unit, wherein the management unit is configured to modify the third electric signal in accordance to the operation status of at least one of the transceiver assembly, or the data processing unit; and
an optical interface in communication with the transceiver assembly, wherein the optical interface is configured to receive the first optical signal from a remote network device and send the second optical signal to the remote optical device, wherein the management unit is configured to produce a control signal to modify the third electric signal if the operation status indicates that at least one of the transceiver assembly or the data processing unit malfunctions or if the optical interface fails to receive the first optical signal from the remote network device.

12. The pluggable optical network unit of claim 11, wherein the management unit is configured to modify the third electric signal with a first control signal in a first pattern if the optical interface fails to receive the first optical signal from the remote network device, wherein the management unit is configured to modify the third electric signal with a second control signal in a second pattern if the operation status of the transceiver assembly indicates that the transceiver assembly malfunctions, wherein the management unit is configured to modify the third electric signal with a third control signal in a third pattern if the operation status of the data processing unit indicates that the data processing unit malfunctions, wherein the management unit is configured to control the interface unit to modify the third electric signal in accordance to the operation status of at least one of the transceiver assembly or the data processing unit.

13. The pluggable optical network unit of claim 11, wherein the interface unit is configured to receive the transmission signal data from the network device that the pluggable optical network unit is plugged into, deserialize the transmission signal data, and send the transmission signal data to the data processing unit.

14. The pluggable optical network unit of claim 11, further comprising a data path interface in communication with a data processing unit in the network device, wherein the data path interface is configured to send the reception data to the network device and to receive a fourth electrical signal comprising the transmission signal data from the network device that the pluggable optical network unit is plugged into, wherein the data path interface is compatible with a standard selected from the group consisting of GBIC, SFF, SFP, XFP, X2, XENPAK, and SFP+.

15. A method of communication and monitoring in an optical network, comprising:
plugging a pluggable optical network unit into a local network device having an indicator light, wherein the pluggable optical network unit comprises a transceiver assembly, a data processing unit, and an interface unit;
producing a first electrical signal by the transceiver assembly in response to a first optical signal, wherein the first optical signal comprises reception signal data;
extracting the reception signal data from the first electrical signal by the data processing unit;
receiving the reception signal data by the interface unit;
serializing the reception signal data by the interface unit;
sending a third electric signal comprising the reception signal data from the interface unit to the local network device;
producing a second electrical signal by the data processing unit in response to the transmission signal data;
emitting a second optical signal by the transceiver assembly in response to the second electrical signal; and
producing a control signal to modify the third electric signal if the operation status indicates that at least one of the transceiver assembly or the data processing unit malfunctions.

16. The method of claim 15, further comprising monitoring the operation status of at least one of the transceiver assembly or the data processing unit by a management unit.

17. The method of claim 16, wherein the management unit is configured to control the interface unit to modify the third electric signal in accordance to the operation status of at least one of the transceiver assembly or the data processing unit.

18. The method of claim 15, wherein the control signal is configured to modulate the third electric signal by a first pattern if the operation status indicates that at least one of the transceiver assembly or the data processing unit malfunctions.

19. The method of claim 15, further comprising:
receiving the first optical signal at an optical interface from a remote network device;
sending the second optical signal from the optical interface to the remote optical device; and
modifying the third electric signal with a first control signal in a first pattern if the optical interface fails to receive the first optical signal from the remote network device.

20. The method of claim 19, further comprising:
modifying the third electric signal with a second control signal in a second pattern if the operation status of the transceiver assembly indicates that the transceiver assembly malfunctions; and
modifying the third electric signal with a third control signal in a third pattern if the operation status of the data processing unit indicates that the data processing unit malfunctions.

21. The method of claim 15, wherein the interface unit is configured to receive the transmission signal data from the local network device, deserialize the transmission signal data, and send the transmission signal data to the data processing unit.

22. The method of claim 15, wherein the step of modifying the third electric signal produces a modified electric signal, wherein the modified electric signal is used to control the indicator light on the local network device to emit a light signal.

* * * * *